US008719184B2

(12) United States Patent
Buchanan

(10) Patent No.: US 8,719,184 B2
(45) Date of Patent: May 6, 2014

(54) ENERGY CONSUMPTION REPORTING AND MODIFICATION SYSTEM

(76) Inventor: Daniel Buchanan, Hamilton, OH (US)

(*) Notice: Subject to any disclaimer, the term of this patent is extended or adjusted under 35 U.S.C. 154(b) by 550 days.

(21) Appl. No.: 12/651,937

(22) Filed: Jan. 4, 2010

(65) Prior Publication Data

US 2011/0166913 A1 Jul. 7, 2011

(51) Int. Cl.
*G06F 17/00* (2006.01)
(52) U.S. Cl.
USPC ........................................................ 705/412
(58) Field of Classification Search
USPC ............. 705/412, 400, 7.11, 7.12, 7.23–7.25, 705/7.31, 7.35–7.37, 1.1, 348, 28–30, 35; 700/275–279, 286, 291, 295, 299, 300
See application file for complete search history.

(56) References Cited

U.S. PATENT DOCUMENTS

| | | | |
|---|---|---|---|
| 5,566,084 A | 10/1996 | Cmar | |
| 6,785,592 B1 | 8/2004 | Smith et al. | |
| 7,451,017 B2 | 11/2008 | McNally | |

OTHER PUBLICATIONS

Parker, D. S., "Research Highlights from a Large Scale Residential Monitoring Study in a Hot Climate." Proceeding of International Symposium on Highly Efficient Use of Energy and Reduction of its Environmental Impact, pp. 108-116, Japan Society for the Promotion of Science Research for the Future Program, JPS-RFTF97P01002, Osaka, Japan, Jan. 2002. (Also published as FSEC-PF369-02, Florida Solar Energy Center, Cocoa, FL.).
Oikos.com, Manual J Exaggerates Cooling Load, Energy Source Building #50, Apr. 1997.

*Primary Examiner* — Igor Borissov
(74) *Attorney, Agent, or Firm* — Wood, Herron & Evans, LLP

(57) ABSTRACT

Provided are methods and apparatus that determine a benchmark of energy consumption for an energy system and utilize the determined benchmark in a variety of ways. Once determined, the determined benchmark may be compared to current energy consumption and current outdoor temperature to verify proper operation of the system and identify deviations in system operation. The benchmark may be used to determine the impact of an implemented change in the operation of the system. The determined benchmark may also be used to contract for a term in an agreement and to verify the satisfaction of a term in an agreement.

30 Claims, 9 Drawing Sheets

ENERGY CONSUMPTION REPORTING AND MODIFICATION SYSTEM

FIELD OF THE INVENTION

The present invention relates to monitoring, analyzing, and reporting of energy consumption for structures, including commercial buildings.

BACKGROUND OF THE INVENTION

Energy consumption often presents a significant cost to companies. However, typical ways to measure energy consumption lack the ability to identify or pinpoint energy consumption deficiencies in commercial buildings. The standard methods of energy consumption analysis used by the Department of Energy's Energy Star program and the general engineering community typically rely on heating and cooling degree days to approximate energy consumption. In the U.S., the degree day unit of measure estimates the demand for energy required for heating or cooling using the typical standard outdoor air temperature of 65° F. (18.3° C.). For each 1° F. decrease or increase from this standard in the average outside temperature, one heating or cooling degree day is recorded. For instance, if the average mean outside temperature for a day was 60° F., it records as 5 heating degree days (HDD); if it was 70° F., it records as 5 cooling degree days (CDD). Although this method may be utilized for analyzing the total energy consumption in a 24 hour period, this method typically does little to explain how that energy was consumed in that 24 hour period. For instance, the degree day method of energy consumption analysis typically makes no correlation between the instantaneous building heating and/or cooling loads and the performance of the mechanical systems in the facility.

Some studies have represented energy consumption in a scatter pattern based on outdoor temperature and KW or kilowatts, but there is still a need to improve the measurement of energy consumption and utilize the findings.

SUMMARY OF THE INVENTION

Embodiments of the invention provide methods and apparatus to address the need arising from the prior art.

In particular, embodiments of the invention use a benchmark of energy consumption for an energy system in a variety of ways. In particular, embodiments consistent with the principles of the invention may receive comparative data for the energy system. The received comparative data includes outdoor temperature data for a plurality of outdoor temperatures over a period of time that the energy system is activated, and the received comparative data includes energy consumption data for the energy system corresponding to the received outdoor temperature data. The embodiments may also determine the benchmark based upon time correlation of the received outdoor temperature data and the received energy consumption data for the energy system. The determined benchmark is indicative of energy consumption expected by the energy system at different outdoor temperatures.

Once determined, the determined benchmark may be compared to current energy consumption and current outdoor temperature to verify proper operation of the system and identify deviations (e.g., unintentional changes) in system operation. Alternately, the benchmark may be used to determine the impact (e.g., effectiveness or lack thereof) of an implemented change (e.g., intentional change) in the operation of the system. The determined benchmark may also be used in agreements with energy providers, establishing a baseline of energy consumption to qualify for a discount or avoid a penalty, that is a function of outdoor temperature. The determined benchmark may also be used to contract for a term in an agreement (e.g., in agreements with energy consultants to reduce energy consumption by a specific percentage) and to verify the satisfaction of a term in an agreement. Thus, the determined benchmark may be used to negotiate energy savings standards into agreements with energy providers as well as energy consultants.

The principles of the present invention may be implemented by the use of a computer system programmed with software, an online service (software as a service or application service provider) or as a programmed product delivered for use on general purpose computer systems. Moreover, the invention may be used as part of a business consulting process that incorporates the steps and methods of the invention using a computer system.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

Figure 1:
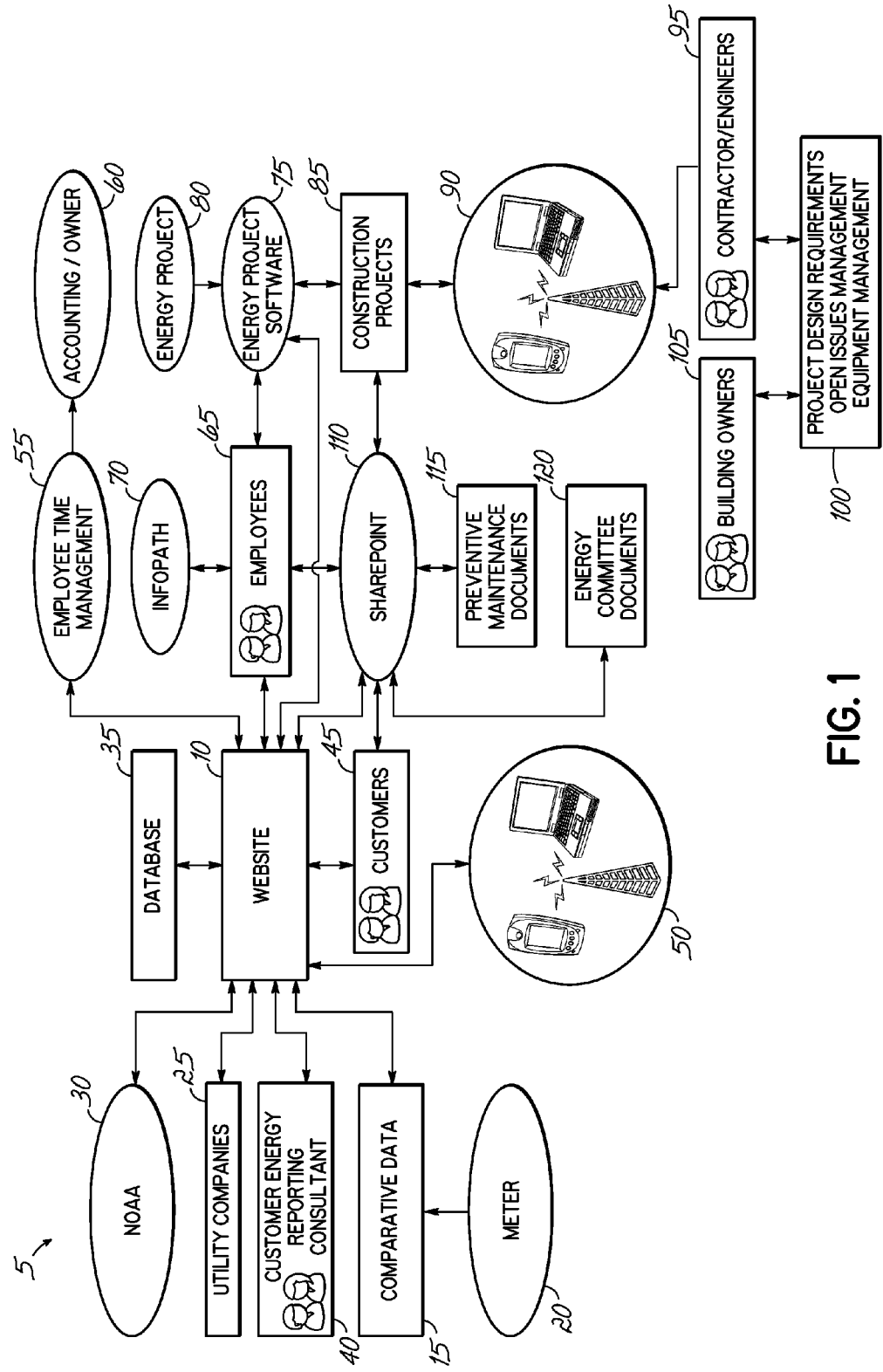
FIG. 1 is a block diagram of a distributed implementation of an energy consumption reporting and modification system consistent with the principles of the present invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

When evaluating the energy consumption of commercial buildings or other buildings, two important variables that determine how much energy a building will consume is its occupancy level and the heating/cooling load placed on the mechanical systems of the facility. In general, for commercial buildings, energy consumption due to occupancy is a time sensitive event. For instance, at about 8:00 A.M., people begin to enter a building and conduct the daily business of the day. As lights are turned on and office equipment is utilized, the building's energy consumption rises. At about 5:00 P.M., people begin to go home and the energy consumption of the building drops off to an unoccupied level once again. If the heating and air conditioning loads of a facility are factored out, the basic energy consumption profile of the facility is predictable if the time of day is known. Once a facility's heating and cooling loads is introduced into an energy profile analysis, energy models become a function of the time of day occupancy and the heating/cooling load of the building.

But when degree day based energy analysis methods are used, the ability to analyze how building occupancy and specific outdoor air temperatures effect how commercial buildings consume energy is typically hampered. This is because the degree day method of analysis looks at an average energy use over 24 hour period, and no correlation is typically made to describe instantaneous energy consumption load caused by a specific occupancy level, at specific time of day, at a specific outdoor air temperature load. Unless these factors are considered for a commercial building's (or other building's) energy consumption on an instantaneous consumption level, one may not be able to accurately assess how the commercial building consumes energy at precise loads or make meaningful observations concerning performance of the commercial building's mechanical assets. Thus, consistent with the principles of the present invention, all of this information may be provided as comparative data (or comparison data) to determine a benchmark that is indicative of energy consumption expected by the energy system at different outdoor temperatures, and the determined benchmark (or just benchmark) be utilized in a variety of ways.

Indeed, embodiments of the invention include methods and apparatuses to determine a benchmark of energy consumption for an energy system over a period of time to gauge typical energy consumption by the system, and utilize the benchmark in various ways. For example, the determined benchmark may be utilized to determine how a change implemented to the system impacts energy consumption (e.g., whether it lowers energy consumption or increases energy consumption). Changes that lower energy consumption may be maintained while changes that increase energy consumption may be reversed.

Furthermore, the determined benchmark may be utilized to identify a deviation in energy consumption, including a deviation in energy consumption that is above the determined benchmark as well as a deviation in energy consumption that is lower than the determined benchmark. For instance, if the energy consumption of the energy system based on the benchmark has a range of x kilowatts to y kilowatts when the outdoor temperature is t Fahrenheit, a deviation may be identified that is above or below the benchmark when that same or similar temperature is again encountered. Upon identification of a deviation in energy consumption that is above the determined benchmark (i.e., signifying higher than expected energy consumption), an occurrence causing (or likely causing) the deviation may be identified and reversal of that occurrence may be initiated. Upon identification of a deviation that is below the determined benchmark (i.e., signifying lower than expected energy consumption), the deviation may be maintained and reported to an energy provider and a discount may be received. If no deviation is identified, then the energy system is likely operating as expected.

The benchmark may be determined for each energy system at a building or facility. The energy system may be a heating, ventilating, and air conditioning system known as an HVAC system, a heating and cooling system, practically any system that consumes energy, larger system with at least one HVAC system and other energy consuming equipment or that affect energy consumption, etc. Of note, the benchmark is not just of the HVAC system, but may be of the entire building or facility, as data typically comes off the main meter and includes lights, computers, etc., not just data from the HVAC system. Indeed, the energy reduction actions taken in other areas, such as installation of Energystar computer monitors, may be identified or reflected in the benchmark. Thus, changes in use habits, such as trying to change the way the lights are used, may be implemented and evaluated against the benchmark for effectiveness. As such, the principles of the present invention may be applicable to practically any energy system, including a larger system that includes at least one HVAC system. Moreover, the principles of the present invention may be applicable regardless of the type of energy that is consumed (e.g., natural gas or just gas, electricity or just electric, fuel oil, etc.).

As occupancy may be a strong factor in energy consumption, occupied and unoccupied days may be separately benchmarked. Similarly, "weekday" and "weekend" days, as well as "peak" and "off peak", may be separately benchmarked. What is considered "peak," "off peak," "occupied," "unoccupied," "weekday," and "weekend" depends upon the building or facility because if substantial business is conducted between midnight and 4:00 AM, for example, this may be considered peak instead of off peak. The benchmark may be determined for each of these from the comparative data.

Comparative data may include practically any data that is associated with the energy system, and may include data specific to the building such as exact or approximate square footage or size of the building, exact or approximate energy consumption data, exact or approximate outdoor temperature data, exact or approximate time associated with the data, exact or approximate date associated with the data, etc. The terminology comparative data or comparison data is used for simplicity to refer to the data that may be utilized to determine the benchmark.

Specifically, the comparative data may include a plurality of data points over a period of time for a plurality of outdoor temperatures (e.g., over a period that includes the summer, fall, winter, and spring seasons from zero degrees Fahrenheit to 125 degrees Fahrenheit or over a period of days). The period of time may vary, and may be, for example, three years or two years or one year of data to determine the benchmark, or any other period that may adequately predict the expected energy consumption by the energy system. Alternatively, an average period may be utilized, such as the average of two years. For instance, a year with the most outdoor temperature data variations may be selected, or largest range of outdoor temperature data within the last three years may be selected, or multiple years may be combined and each outdoor temperature stamp may be averaged to establish the benchmark.

The data points may be received about every fifteen minutes (i.e., in fifteen minute intervals) or other interval such as about every hour.

Each data point in the benchmark may be associated with a date, with a time, with the exact or approximate energy consumption (e.g., in kilowatts, mcf, etc.) of the energy system at that date and time, with the exact or approximate outdoor temperature (e.g., in Fahrenheit or Celsius) at that date and time, etc. Thus, the benchmark may be determined based upon received outdoor temperature data and received energy consumption data for the energy system, among other comparative data. Outdoor temperature data may be measured at the location being benchmarked, or may be acquired from public sources such as published data from the National Oceanic and Atmospheric Administration (NOAA). NOAA may include temperature data it has gathered from around the world.

Those of ordinary skill in the art will appreciate that the determined benchmark may be utilized as an objective standard to make decisions regarding energy consumption for the energy system, document energy consumption by the energy system, including typical, lower, and/or higher energy consumption expected by the energy system, as well as other benefits. The determined benchmark also functions to predict or set expectations of energy usage when the same or similar criteria is encountered (e.g., the same or similar outdoor temperatures are encountered). For simplicity, the term similar will be used herein to refer to both same and/or similar. The determined benchmark may also provide real-time or near real-time expectations. Appendices A-N illustrate exemplary reports consistent with the principles of the present invention.

Indeed, the following benefits may be provided in accordance with the principles of the present invention. A customer running the energy system may benefit as follows: its energy consumption may be lowered, the costs of running the system may be reduced, more efficient operation of the system may result, which may extend the life of the system and delay replacement, receive additional discounts or rewards for curtailing energy consumption, avoid penalties, verify performance of terms in agreements, set terms in agreements, detrimental changes may be reversed while beneficial changes may be maintained, deviations in expected energy consumption may be identified and reversed if detrimental or maintained if beneficial, the negative impact on the environment from energy consumption may be reduced, etc. Indeed, the benchmark may even be utilized by the customer to constrain energy consumption among all or many of the outdoor temperatures and may lead to reduction in utility bills. Furthermore, the energy provider that provides energy to the customer benefit as follows: it may be better able to predict the energy consumption needs for at least some of its customers, and as a result, this may lead to better management of energy resources, reduction of blackouts, cost savings as the provider may be able to reduce the need to purchase energy on the open market from another energy provider to meet its demand, delay the costly construction of additional power plants to meet demand, reduction of environmental impact, etc. For an energy consultant (or entity or energy service company), who are often employed to analyze the customer's energy usage (Appendices D-E) and to lower it, but typically find it difficult to show that the energy consultant has accomplished his or her job, the energy consultant may benefit as follows: the energy consultant may be better able to prove that the customer's energy savings are higher than the fees paid to the energy consultant for his or her services, verify satisfaction of terms in agreements, identify whether changes that are implemented by the energy consultant are beneficial or detrimental, etc. Furthermore, energy consultants may be able to contract for and have more realistic terms set in agreements via the benchmark. For instance, an energy consultant that replaces or manages the energy system may be able to contract to reduce energy use by 7% and demonstrate that accomplishment using the benchmark. Thus, a business model may be created for the energy consultant via the benchmark or benchmarks.

Indeed, those of ordinary skill in the art will appreciate that the benchmarks may provide a reasonable level of certainty that was typically not available. As such, this may reduce the uncertainty in the energy industry, and may reduce the arguments over energy bills and other energy related activities.

Turning now more specifically to the figures, wherein like numbers denote like parts throughout the several views, FIG. 1 illustrates a distributed implementation of an energy consumption reporting and modification computer system or environment consistent with the principles of the present invention. In general, the arrows in FIG. 1 illustrate the possible flow of information (e.g., one way communication vs. two way communication) or possible interactions. Specifically, a website 10 such as Pathian.com, but not limited to Pathian.com, may be the central hub of the computer system 5, and accessible via the Internet. The website 10 may include a mainframe and may function as a server (discussed further in connection with FIG. 2). Functions of the mainframe may include reporting deviations in energy consumption by the energy system that are above or below the benchmark by sending emails pointing out to the recipient a dramatic efficiency change. Furthermore, a function of the mainframe may be management of documents (e.g., energy related documents). Another function of the mainframe may be to minor an energy star management process, in other words, implementing an energy project, measuring the performance of the energy system subsequent to the implemented energy project and compare the performance to the benchmark to determine whether the implemented energy project lowered energy consumption, and repeat the process for each implemented energy project.

The website 10 may receive comparative data from a variety of sources, for example, comparative data such as energy consumption data for the energy system, in the form of kWh, may be received as comparative data 15. The comparative data 15 may be received directly from at least one meter 20, such as a kWh meter, as pulse and/or analog output. The kWh meter may be situated at the building or facility with the energy system. The kWh energy consumption data that is transmitted to the website 10 may be in the form of a mapped Excel file on a server of the customer (i.e., customer running the energy system such as customers 45), and the IT personnel of the customer may have to coordinate this. The energy consumption data may also be transmitted to the website 10 directly from utility companies or energy providers 25. In particular, the utility companies 25 often have a website or web page where the customer may get energy consumption data, and this data may be directly transmitted to the website 10 from the utility companies 25, or to the customer in the comparative data 15 and then transmitted to the website 10. The utility companies 25 typically provide energy consumption data (e.g., for electric) every fifteen minutes for all commercial customers. However, residential customers may also have energy consumption data every fifteen minutes by updating their meters. Although those of ordinary skill in the art will appreciate that the more frequent the received data, the more data points, and the more accurate the benchmark may be, however, data points may be received in other intervals, not just every fifteen minutes. Moreover, as noted hereinabove, the principles of the present invention may be applicable to practically any type of energy that is consumed (e.g., natural gas or just gas, electricity or just electric, fuel oil, etc.). In the case of fuel oil, the customer may have to provide the website 10 with the gallons of fuel oil consumed.

Figure 8:
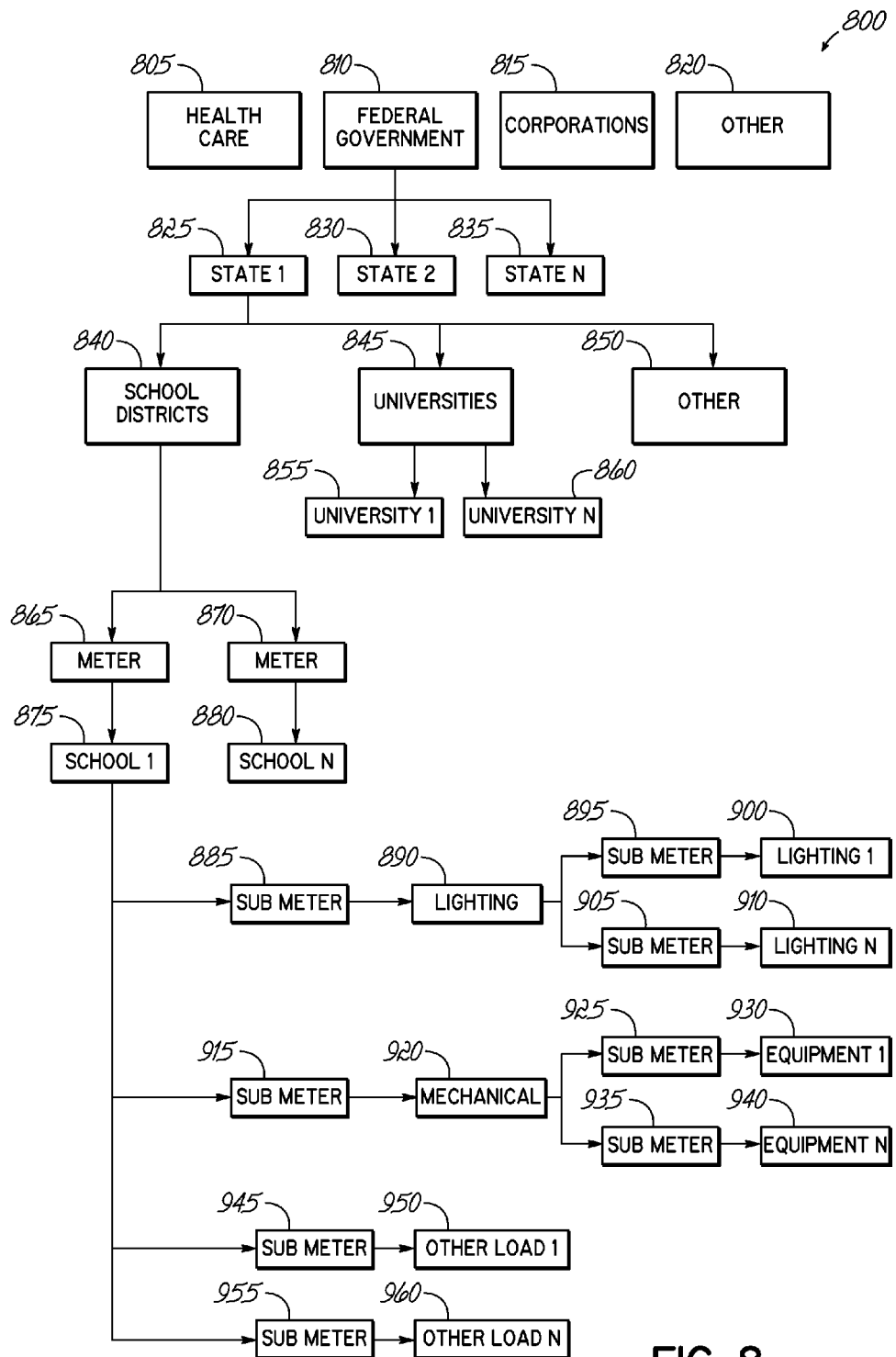
FIG. 8 illustrates a more detailed meter structure of the meter in FIG. 1 consistent with the principles of the present invention.

Turning more specifically to the meter 20, FIG. 8 illustrates a meter structure 800 that illustrates different sources where comparative data, such as energy consumption data, may be received from and/or retrieved from. Specifically, each of the health care, corporations, and other entities at blocks 805, 815, and 820, respectively, may have a substructure similar to that of the federal government of block 810, including a variety of meters and sub meters with comparative data. As illustrated, the federal government of block 810 may include a plurality of states, such as state 1 at block 825, state 2 at block 830, and state n at block 835. And, each of the state 2 and state n may be further broken down as illustrated in connection with state 1.

State 1, for example, may have school districts at block 840, universities at block 845, and other at block 850. Each of these may further be broken down, for example, the universities at block 845 may be broken down to university 1 at block 855 and university n at block 860, and may be broken down even further such as the school districts at block 840. The school districts may be broken down into a first meter at block 865 with data from school 1 at block 875 and a second meter at block 870 with data for school n at block 880.

School 1 at block 875 may include a sub meter 885 for lighting 890, which depends upon sub meter 895 for lighting 1 at block 900 and sub meter 905 for lighting n at block 910. School 1 may further include a sub meter 915 for mechanical 920, such as mechanical equipment, which depends upon sub meter 925 for equipment 1 at block 930 and sub meter 935 for equipment n at block 940. Similarly, school 1 at block 875 may include a sub meter 945 for some other load 1 at block 950 and sub meter 955 for some other load n at block 960.

Of note, each of the meters and sub meters illustrated in FIG. 8, for example, may provide comparative data, including energy consumption data. Those of ordinary skill in the art will appreciate that many other meters, sub meters, as well as other sources not illustrated in FIG. 8 may provide comparative data.

Returning to FIG. 1, comparative data such as outdoor temperature data may be received by the website 10 from National Oceanic and Atmospheric Administration or NOAA 30 or even from comparative data 15. For example, NOAA 30 may provide weather data by zip code and hourly. Alternatively, the outdoor temperature data may be provided more locally or during different intervals. Of note, the energy consumption data and the outdoor temperature data may be received at different intervals (e.g., energy consumption data may be received at about every fifteen minutes while outdoor temperature data may be received at about every hour). Also, data may not always be available consistently, thus, some comparative data such as energy consumption data and the outdoor temperature data may be received as available, including sporadically. On the other hand, multiple data may be available. For example, there may be multiple outdoor temperature data (e.g., two readings) received from NOAA for hour 11 (i.e., 11:00 AM), in such a case, both of the readings may be utilized or one may be ignored depending on how much other data is available. Nonetheless, the energy consumption data and the outdoor temperature data may be received by the website 10 for the energy system over a period of time.

Comparative data may include practically any data that is associated with the energy system, and may include data specific to the building such as exact or approximate square footage or size of the building, exact or approximate energy consumption data (e.g., kWh, kVar, kVa, power factor, Mcf, etc.), exact or approximate outdoor temperature data (e.g., as dry bulb, as wet bulb, or as enthalpy), exact or approximate time associated with the data (or portion thereof such as the hour), exact or approximate date associated with the data (or portion thereof such as year), timestamp associated with data, account number (e.g., customer's account number utilized by the energy provider), etc. The abbreviation kWh stands for kilowatt hour and is typically the unit of measurement for electricity. The abbreviation kVar refers to reactive power present in an electrical circuit. The abbreviation kVa refers to apparent power in an electrical circuit. Power factor typically refers to how much energy is consumed by the energy system when compared to how much energy was received from the energy provider and is expressed as the ratio of real power to apparent power. The Power Factor is a number between 0 and 1 that is expressed as a percentage. For example, the energy provider may increase its charges on an energy bill if the power factor falls below 0.90 or 90%. The abbreviation Mcf is typically the unit of measurement for natural gas and is equal to 1,000 cubic feet of natural gas. Dry bulb temperature refers to a measurement of the outdoor temperature one would read from a home thermometer. Wet bulb temperature refers to is the lowest temperature that can be reached by the evaporation of water only. It is the temperature you feel when your skin is wet and is exposed to moving air. Unlike dry bulb temperature, wet bulb temperature is an indication of the amount of moisture in the air. Enthalpy refers to the total sensible and latent heat content of the air.

The energy consumption data, the outdoor temperature data, and any other comparative data received by the website 10 may be stored in database 35, which is associated with the website 10. Once sufficient data points are received for meaningful analysis (e.g., analysis that will likely predict energy consumption by the energy system with reasonable certainty), the benchmark may be determined by the website 10 from this data for the energy system. The benchmark may be determined by adding up the received energy consumption data per outdoor temperature during the period of time, averaging the sums per outdoor temperature during the period, and normalizing the averages, if necessary (e.g., by utilizing square footage). Thus, every time the outdoor temperature was 13 degrees Fahrenheit, for example, or similar to that in some embodiments (and may depend on availability of data), such as 13.1 degrees Fahrenheit, the kWh may be added up, and ultimately the sum may be averaged (e.g., by dividing the sum by the quantity of kWh values added) to get a benchmark in the form of a single value for 13 degrees Fahrenheit. The same process may be repeated for each outdoor temperature where data has been received. Furthermore, all of the averages per degree may be summed and averaged to have a single benchmark value such as a single benchmark value of all kWh usage across all temperatures received. The determined benchmark may further be broken down per hour by adding and averaging the energy consumption data per outdoor temperature per hour.

As an example of normalizing by square footage, if the benchmark is determined for a building that has a square footage of 100,000, and an additional 100,000 square footage is added to the building that will operate in the same or similar manner as the initial square footage so that it will likely consume energy at the same or similar rate, then the determined benchmark may be multiplied by two to determine the new benchmark. Nonetheless, the received comparative data such as the energy consumption data and the outdoor temperature data may be received as described above, the energy consumption data may be correlated with the outdoor temperature data, the energy consumption data may be summed per outdoor temperature data, and the sum may be averaged per outdoor temperature data to determine the benchmark.

Thus, how much energy is typically consumed by the energy system when the outdoor temperature is 5 degrees Fahrenheit may be predicted by determining the benchmark by adding and averaging the energy consumption data of the energy system per outdoor temperature data of 5 degrees Fahrenheit. And, the determined benchmark may even be used in the case of new additions to a building or a totally new construction using a benchmark from the old building. Square footage as the compensating factor may be particularly accurate if the model building is of the same kind as the new building. The determined benchmark may be illustrated as a curve or a value or multiple values. Indeed, those of ordinary skill in the art will appreciate that various ways to represent the benchmark may be available. The determine benchmark may be illustrated as a value or values as in the exemplary reports at Appendices A-C, F-K and/or as a curve as in FIGS. 3A-4 and in the exemplary reports at Appendices A, G-K.

Of note, "bm" or "BM" in Appendices G-K, for example, stand for benchmark. In Appendices G-K, the forward curves (sometimes indicated to be the forward blue curves) illustrate actual energy consumption by the facility. The rear curves (sometimes indicated to be the rear magenta curves) illustrate the benchmark. On the other hand, in Appendix K, the forward curves at the top left hand corners of each page illustrate the benchmark Mcf curve, and the rear curves illustrate the actual Mcf consumed. In Appendix A, the curves from front to rear are Off Peak kWh, 24 Hour kWh, Peak kWh, and kWh Benchmark Per Hour Per DegF.

Returning to FIG. 1, the customers 45 may be able to login to the website 10 or a webpage of website 10 to see the determined benchmark (e.g., as a value, values, or in the form of a curve), to see energy consumption (e.g., actual energy consumption data or actual average energy consumption data) based on the comparative data (e.g., as a value, values, or in the form of a curve), to see comparative data, to see outdoor temperature data, to see energy consumption in comparison to the determined benchmark, etc. Alternatively, an energy consultant or customer energy reporting consultant 40 may interact with the website 10 and provide the customer with this information. Both of these alternatives are illustrated. Exemplary reports are provided in Appendices G-K to illustrate the determined benchmark and energy consumption compared to the determined benchmark, as well as other comparative data. Furthermore, PDA's, laptops, etc. 50 may be utilized (e.g., by the customers or the energy consultant) to interact with the website 10. In particular, the website 10 may include at least one interface for interaction with it.

The website 10 may also receive and/or provide information associated with employee time management 55, and this information may be provided to accounting and/or the the website sponsor 60. The employees 65 of the sponsor may also interact with the website 10, with the employees (e.g., at the sponsor's office) interacting with MS InfoPath (or similar software) 70 and energy project software 75. The energy project software 75 may be server based project management software such as MS project. Energy project 80 to be managed by the software 75 may include peak load scheduling programming, fan strategies, equipment upgrades (e.g., mechanical equipment upgrades), etc. The software 75 may keep track of pending tasks, an open issues list of issues to be addressed, scheduling (e.g., preventive maintenance scheduling and/or management), etc. The software 75 may also be utilized to track construction projects 85 such as construction of a new building (or addition), review of the building plans, the engineer plans for the new building, etc.

Information regarding the construction projects 85, for example, may be received from via PDA's, laptops, etc. 90 from a contractor and/or engineers 95. In particular, the contractor/engineers 95 may want to provide information regarding items 100 including project design requirements, open issues management, equipment management, etc. The items 100 may require input from the building owners 105.

Returning to the employees 65, the employees 65 may also interact with a document management server such as SharePoint 110. For example, SharePoint 110 may be utilized to exchange drafts and comments amongst the employees 65 as well as others properly authorized, and may include information about construction projects 85 as well as preventative maintenance documents 115 such as documentation on equipment to be maintained, the equipment in general, and a maintenance plan. SharePoint 110 may also contain energy committee documents 120. In particular, each customer may have at least one representative to work with the sponsor on energy related issues, and may also have access to SharePoint 110. Of note, employees 65 may also be the energy consultant 40, but need not be.

Figure 2:
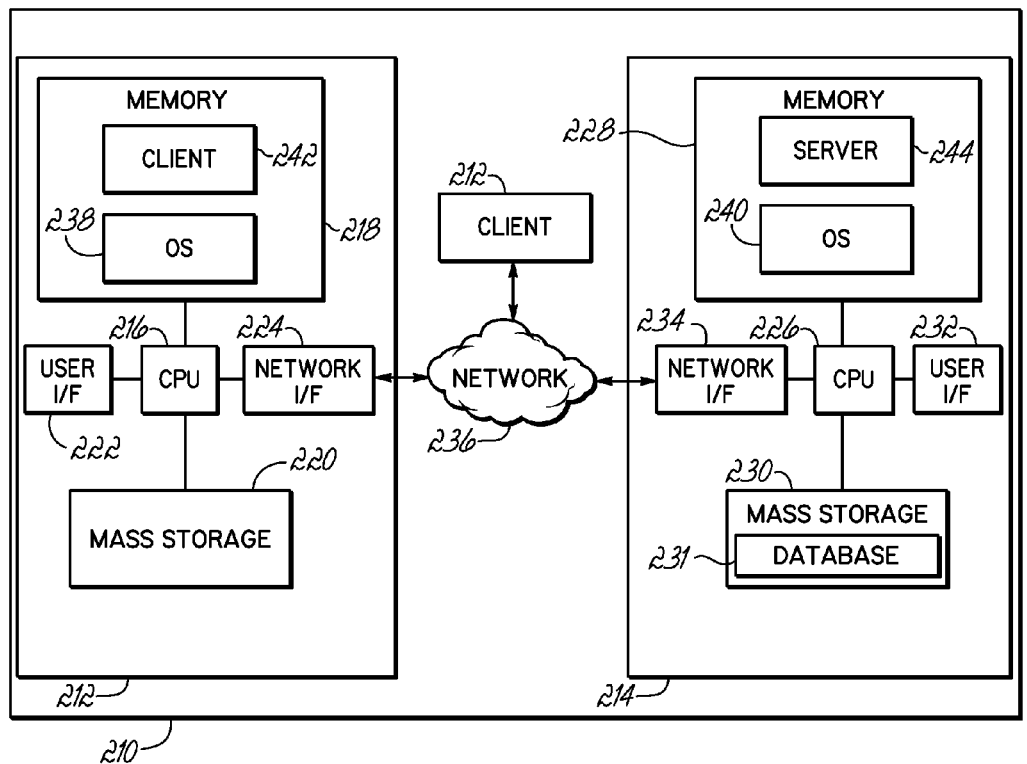
FIG. 2 illustrates a more detailed view of a client-server based computer system or environment of FIG. 1 consistent with the principles of the present invention.

FIG. 2 illustrates a more detailed client-server based computer system or environment 210 consistent with the principles of the present invention. In particular, the client-server computer system 210 may include at least one client computer 212 (e.g., with a web browser or other client such as utility companies 25 from FIG. 1, the PDA's, laptops, etc. 50 from FIG. 1, etc.) and at least one server computer 214 (e.g., with a web server or other server such as the website 10 from FIG. 1, which may be Pathian.com). For instance, the home page of the web site 10 of FIG. 1 and other web pages may be at the server computer 214. System 210 includes at least one apparatus, e.g., one or more client computers 212 and one or more server computers 214. Each computer 212, 214 may represent practically any type of computer, computer system or other programmable electronic device capable of functioning as a client and/or server in a client-server environment. For example, in specific embodiments, computer 212, 214 may be a computer, computer system, computing device, disk array, or programmable device such as a multi-user computer, a single-user computer, a multi-user computer such as a server computer, a midrange computer, a mainframe, a handheld device, a networked device (including a computer in a cluster configuration), a mobile phone, a video game console (or other gaming system), etc. Moreover, each computer 212, 214 may be implemented using one or more networked computers, e.g., in a cluster or other distributed computing system. Moreover, as is common in many client-server systems, typically multiple client computers 212 will be interfaced with a given server computer 214.

Computer 212 typically includes a central processing unit (CPU) 216 including at least one microprocessor coupled to a memory 218, which may represent the random access memory (RAM) devices comprising the main storage of computer 212, as well as any supplemental levels of memory, e.g., cache memories, non-volatile or backup memories (e.g., programmable or flash memories), read-only memories, etc. Each CPU 216 is typically implemented in hardware using circuit logic disposed on one or more physical integrated circuit devices, or chips. Each CPU 216 may be one or more microprocessors, micro-controllers, field programmable gate arrays, or ASICs, while memory 218 may include random access memory (RAM), dynamic random access memory (DRAM), static random access memory (SRAM), flash memory, and/or another digital storage medium, typically implemented using circuit logic disposed on one or more physical integrated circuit devices, or chips. As such, memory 218 may be considered to include memory storage physically located elsewhere in computer 212, e.g., any cache memory in a processor in CPU 216, as well as any storage capacity used as a virtual memory, e.g., as stored on a mass storage device 220 or on another computer coupled to computer 212. Thus, the computer 212 may include at least one hardware-based processor. Computer 212 also typically receives a number of inputs and outputs for communicating information externally. For interface with a user or operator, computer 212 typically includes a user interface 222 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 212 may also include one or more mass storage devices 220, e.g., a floppy or other removable disk drive, a hard disk drive, a direct access storage device (DASD), an optical drive (e.g., a CD drive, a DVD drive, etc.), and/or a tape drive, among others. Furthermore, computer 212 may include an interface 224 with one or more networks (e.g., a LAN, a WAN, a wireless network, and/or the Internet, among others) to permit the communication of information with other computers and electronic devices. It should be appreciated that computer 212 typically includes suitable analog and/or digital interfaces between CPU 216 and each of components 218, 220, 222 and 224 as is well known in the art.

In a similar manner to computer 212, computer 214 includes a CPU 226, memory 228, mass storage 230 that may include a database 231 (e.g., the database 35 from FIG. 1), user interface 232, and network interface 234. Like CPU 216, CPU 226 may include at least one hardware-based processor. For instance, each CPU 226 is typically implemented in hardware using circuit logic disposed on one or more physical integrated circuit devices, or chips. Each CPU 226 may be one or more microprocessors, micro-controllers, field programmable gate arrays, or ASICs, while memory 228 may include random access memory (RAM), dynamic random access memory (DRAM), static random access memory (SRAM), flash memory, and/or another digital storage medium, typically implemented using circuit logic disposed on one or more physical integrated circuit devices, or chips. Thus, the server computer 214 may include at least one hardware-based processor. In general, the discussion hereinabove for client computer 212 is applicable to the discussion of server computer 214. However, given the nature of computer 212 as a client and computer 214 as a server, in many instances computer 214 will be implemented using a multi-user computer such as a server computer, a midrange computer, a mainframe, etc., while computer 212 will be implemented using a desktop or other single-user computer or device. As a result, the specifications of the CPU's, memories, mass storage, user interfaces and network interfaces will typically vary between computers 212 and 214. Other hardware environments are contemplated within the context of the invention.

Computers 212, 214 are generally interfaced with one another via a network 236, which may be public and/or private, wired and/or wireless, local and/or wide-area, etc. Moreover, network 236 may represent multiple, interconnected networks. In the illustrated embodiment, for example, network 236 may include the Internet.

Each computer 212, 214 operates under the control of an operating system 238, 240, and executes or otherwise relies upon various computer software applications, components, programs, objects, modules, data structures, etc. (e.g. client 242 such as a web browser and server 244 such as a web server). Moreover, various applications, components, programs, objects, modules, etc. may also execute on one or more processors in another computer coupled to computer 212, 214 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that is used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Thus, those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

In the context of the embodiments discussed herein, the server computer 214 associated with the website 10 (FIG. 1), under control of the CPU 226, may determine a benchmark for an energy system based upon received comparative data such as outdoor temperature data and energy consumption data for the system. Under control of the CPU 226, the server computer 214 may receive data and/or report data (e.g., energy usage, the determined benchmark, etc.) through network interface 234 and/or the user interface 232, and the received data may be stored by the server computer 214 in the database 231. The server computer 214, under control of the CPU 226, may also determine the benchmark, and the determined benchmark may then be utilized in a variety of ways. In particular, the determined benchmark may be utilized to determine the impact of implementation of at least one change in the operation of the energy system, compare additional comparative data received subsequent to the determined benchmark to identify at least one deviation in energy consumption, utilized to contract for at least one term in an agreement, and/or verify satisfaction of a term in an agreement.

For example, the server computer 214, under control of the CPU 226, may receive additional comparative data such as outdoor temperature data and energy consumption data for the energy system subsequent to implementation of at least one change to the system (e.g., intentional change), and compare the additional comparative data such as the outdoor temperature data and energy consumption data received subsequent to the implemented change to the determined benchmark. Furthermore, the server computer 214 may determine whether the implemented change lowered energy consumption by the system based on the comparison, and if not, may initiate reversal of the implemented change (e.g., if the intentionally implemented change involved switching settings, initiating reversal of the implemented change may include automatic reversion to the settings that were in place before the switch, among others), and report the outcome of the comparison (e.g., automatically sending an email notification to the designated personnel via the network interface 234). Yet, changes that lowered energy consumption may be maintained (e.g., automatically make a temporary change permanent).

The server computer 214, under control of the CPU 226, may receive additional comparative data such as outdoor temperature data and energy consumption data for the energy system subsequent to determining the benchmark, and compare the additional comparative data such as the outdoor temperature data and energy consumption data received to identify at least one deviation in energy consumption (e.g., unintentional change to the energy system). As such, the server computer 214, under control of the CPU 226, may identify a deviation of energy consumption by the system that is above the determined benchmark or below the determined benchmark at an outdoor temperature that correlates to a similar outdoor temperature. The server computer 214, under control of the CPU 226, may also determine what occurred during the identified deviation to impact energy consumption, for example, by analyzing time correlation data such as date and/or time that associated with the identified deviation. The occurrence may be reported (e.g., automatically sending an email notification to the appropriate personnel via the network interface 234) and reversal of the occurrence may be initiated for detrimental deviations. Initiating reversal of the occurrence may include automatically identifying equipment that was on before the deviation but that was off after the deviation, automatically determining whether that equipment was scheduled to be turned off, and if not scheduled to be turned off, automatically turning that equipment back on, or automatically identifying maintenance in the building at about the time of the occurrence and automatically notification to the designated personnel of the same to inspect the maintenance area, among others. The server computer 214, under control of the CPU 226, may utilize the determined benchmark to contract for at least one term in an agreement, including enhancement, maintenance, replacement, or energy savings to the energy system. For example, the benchmark may indicate the type of efficiency required to warrant replacement or enhancement to the energy system. Indeed, the determined benchmark may set the minimum energy savings expected based on how the energy system has historically performed per the benchmark, or may set the minimum efficiency expected after maintenance to ensure that the maintenance did not negatively impact the energy system. Furthermore, the server computer 214 may utilize the determined benchmark to contract for at least one discount from an energy provider (e.g., provide benchmark and numbers for negotiations), and may include identifying a deviation of energy consumption by the system that is below the determined benchmark, reporting the deviation to the energy provider (e.g., automatically sending an email notification to the appropriate personnel via the network interface 234), and receiving a discount in response to the deviation (e.g., automatically confirming the presence of a discount on a bill from the energy provider).

The server computer 214, under control of the CPU 226, may verify satisfaction of a term in an agreement. In particular, the server computer 214 may receive additional comparative data such as outdoor temperature data and energy consumption data for the energy system subsequent to the agreement, compare the additional comparative data such as the outdoor temperature data and energy consumption data to the determined benchmark, and determine whether the term has been satisfied. For example, if the agreement has an energy savings term that requires 7% in energy savings for the year 2009, the server computer 214 may compare the actual energy consumption for 2009 with the determined benchmark (e.g., based on comparative data for the year 2005) and illustrate that the percentage in energy savings was 10%, which satisfies the term in the agreement, and may report the outcome. As such, energy consultants may be able to prove that they satisfied the term or terms of an agreement.

Those of ordinary skill in the art will appreciate, as already discussed hereinabove, that additional comparative data may need to be gathered subsequent to an event (e.g., implemented change, agreement, the determined benchmark), received and processed by the server computer 214, under control of the CPU 226. The additional comparative data may then be utilized by comparing this data to the determined benchmark, which sets a baseline and expectations as to how the system will operate in the absence of any implemented changes, deviations, and/or agreements. Thus, for example, the server computer 214 (website 10 in FIG. 1) may be continuously receiving comparative data to initially determine the benchmark, and even data to refine the determined benchmark, and once the benchmark is determined, the server computer 214 may continue to receive and process comparative data to determine the impact of implemented changes, identify deviations, verify performance of terms, as well as other uses for the determined benchmark, etc.

Figure 3A:
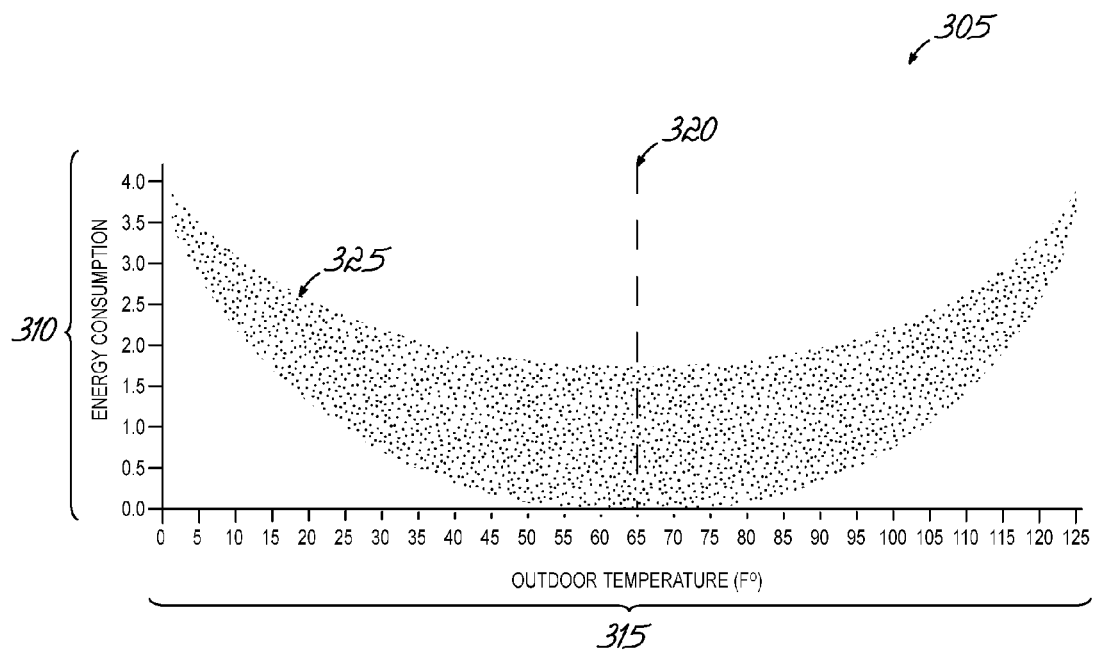
FIG. 3A illustrates a graphical representation of the benchmark of energy consumption in the form of electricity that may be determined and utilized by the system of FIG. 1 or FIG. 2 consistent with the principles of the present invention.
Figure 3B:
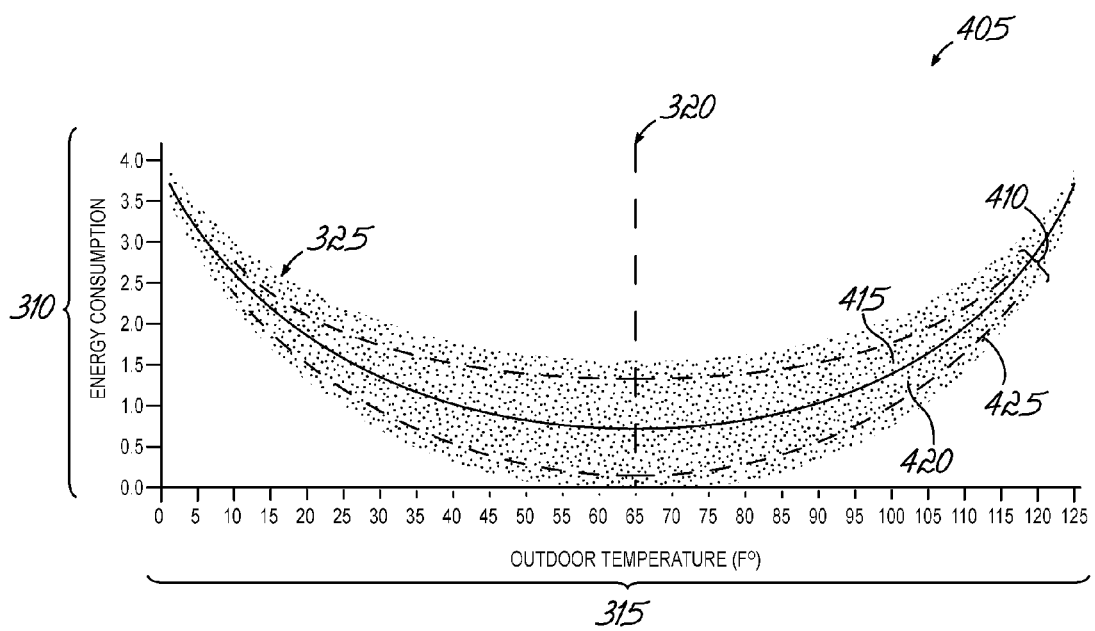
FIG. 3B illustrates a more detailed view of the graphical representation of the benchmark of FIG. 3A consistent with the principles of the present invention.

The subsequently received comparative data may be processed in the same manner as the benchmark, such as adding and averaging of the energy consumption per outdoor temperature, and comparing these values (or value or curve) to the benchmark in equivalent form. For example, comparative data from year "a" may be utilized to determine the benchmark in the form of a curve, a single value for the whole year "a", or multiple values per outdoor temperature of year "a." Next, subsequent comparative data may be received and processed in the manner that the benchmark was determined for year "b." The benchmark may be compared to the results of the comparative data for year "b" and even normalized if the square footage changed, for example. Next, subsequent comparative data may be received and processed in the manner that the benchmark was determined for year "c." The benchmark may be compared to the results of the comparative data for year "c" and even normalized if the square footage changed, and so on. The form that may work the best may depend upon how the benchmark will be utilized, for example, multiple values may preferable to identify deviations whereas verification of a term in an agreement, such as 7% year over year, may be accomplished with the single value. Likewise, the benchmark may be compared to an average or to exact energy consumption from subsequently received comparative data per outdoor temperature. Those of ordinary skill in the art will appreciate that various modifications may be possible, and may depend on the utilization of the determined benchmark, the amount of data, among other factors. Turning to FIGS. 3A and 3B, which illustrate graphical representations of the benchmark for electricity that may be determined and utilized consistent with the principles of the present invention. Specifically, graphical representation 305 illustrates some of the comparative data utilized to determine the benchmark, including energy consumption 310 in kilowatts from 0.0 to 4.0 on the left of the graph over outdoor temperature 315 from zero to 125 degrees Fahrenheit on the bottom. Line 320 is at 65 degrees Fahrenheit, which is typically the point where heating and cooling demands are low. Data points 325 illustrate a variety of data points that may received for an energy system in fifteen minute intervals, where each data point may indicate the energy consumption by the values on the left and the corresponding outdoor temperature with the values on the bottom, forming a scatter pattern. Of note, when the outdoor temperature is low, such as 5 degrees Fahrenheit, energy consumption is high to reflect the higher demand for heat. Likewise, when the outdoor temperature is high, such as at 120 degrees Fahrenheit, energy consumption is also high to reflect the higher demand for cooling. Thus, graphically, the data points 325 may form a u-shape. The more data points 325, the more accurate the benchmark, for example, to reduce the impact of data points that are outliers. The data points 325 may have been received for the fall, winter, spring, and summer seasons or other time period that the energy system was active.

As noted hereinabove, the benchmark is not just of the HVAC system but may be of the entire facility (e.g., entire energy system), as the data typically comes off the main meter and includes lights, computers, etc., not just from the HVAC system. Thus, the energy reduction actions taken in other area, such as installation of Energystar computer monitors, may be identified in the benchmark. Also, changes in use habits, such as trying to change the way the lights are used, may be implemented and evaluated with the benchmark. The graphical representation 405 of FIG. 3B illustrates the benchmark 410 that may be determined for the data points 325. The benchmark 410 may include an upper bound 415, a median bound or average bound 420, and a lower bound 425. Data points above the upper bound 415 may be considered above the benchmark 410 and data points below the lower bound 425 may be considered below the benchmark 410. Thus, those of ordinary skill in the art may appreciate that for any outdoor temperature, then, the determined benchmark 410 may provide a range of where energy consumption should be at or expectation of where energy should be at for this energy system, and data points below the benchmark 410 may be beneficial and reflect lower energy consumption, an implemented change that should be maintained, a cost savings, energy savings, may lead to a discount from the energy provider, etc. On the other hand, data points above the benchmark 410 may be detrimental and reflect that a change that should be reversed, an unexpected deviation should be identified and reversed, higher energy consumption, higher costs, etc. As indicated herein, the determined benchmark may be represented in curve form or as a value or values. Thus, the curve form may simply represent these values (and vice versa with the values represented in curve form). Likewise, the average bound 420 may represent the values (and vice versa). Statistical analysis (e.g., averages) may be utilized to determine the benchmark 410. For example, the statistical analysis may include determining the average energy consumption for each outdoor temperature, and those averages may be illustrated as average bound 420. As explained hereinabove, the benchmark may be determined by adding up the received energy consumption data per outdoor temperature during the period of time, averaging the sums per outdoor temperature during the period, and normalizing the averages, if necessary, for example, by utilizing square footage.

Of note, while the benchmark 410 is illustrated with upper bound 415 and lower bound 425, for example, in some embodiments, the benchmark 410 may only have the average bound 420, with data points determined to be above or below the average bound 420. Further, other values may be utilized in a graphical representation, for example, the outdoor temperature 315 may include values below zero and/or above 125 degrees Fahrenheit, and the energy consumption 310 may include values higher than 4.0 kilowatts. Other variations are also within the scope of the principles of the present invention.

Figure 4:
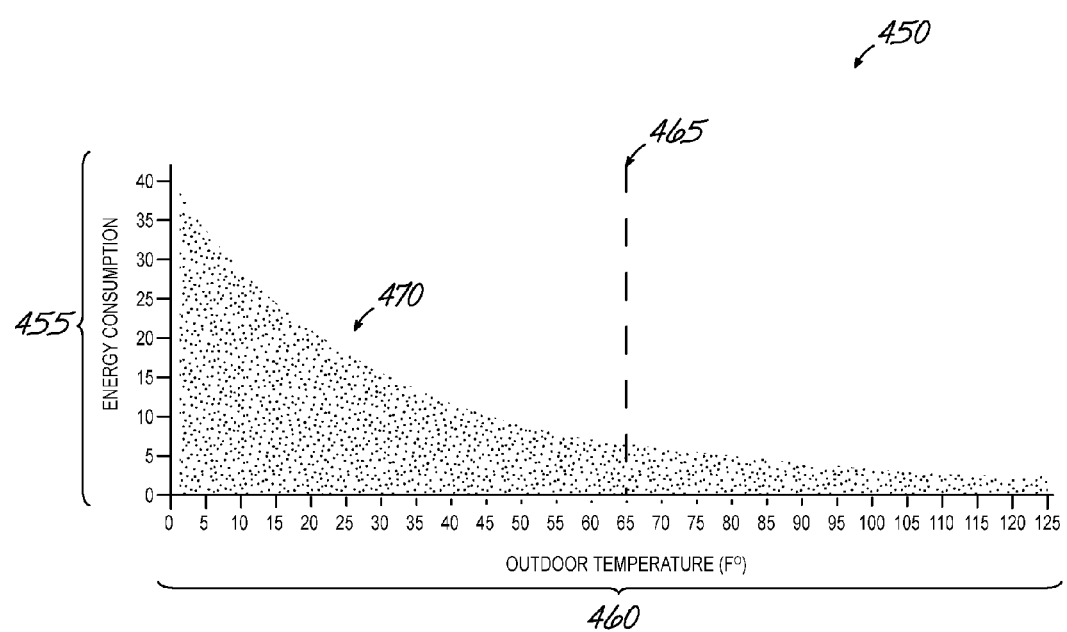
FIG. 4 illustrates a graphical representation of the benchmark of energy consumption in the form of natural gas that may be determined and utilized by the system of FIG. 1 or FIG. 2 consistent with the principles of the present invention.
Figure 5:
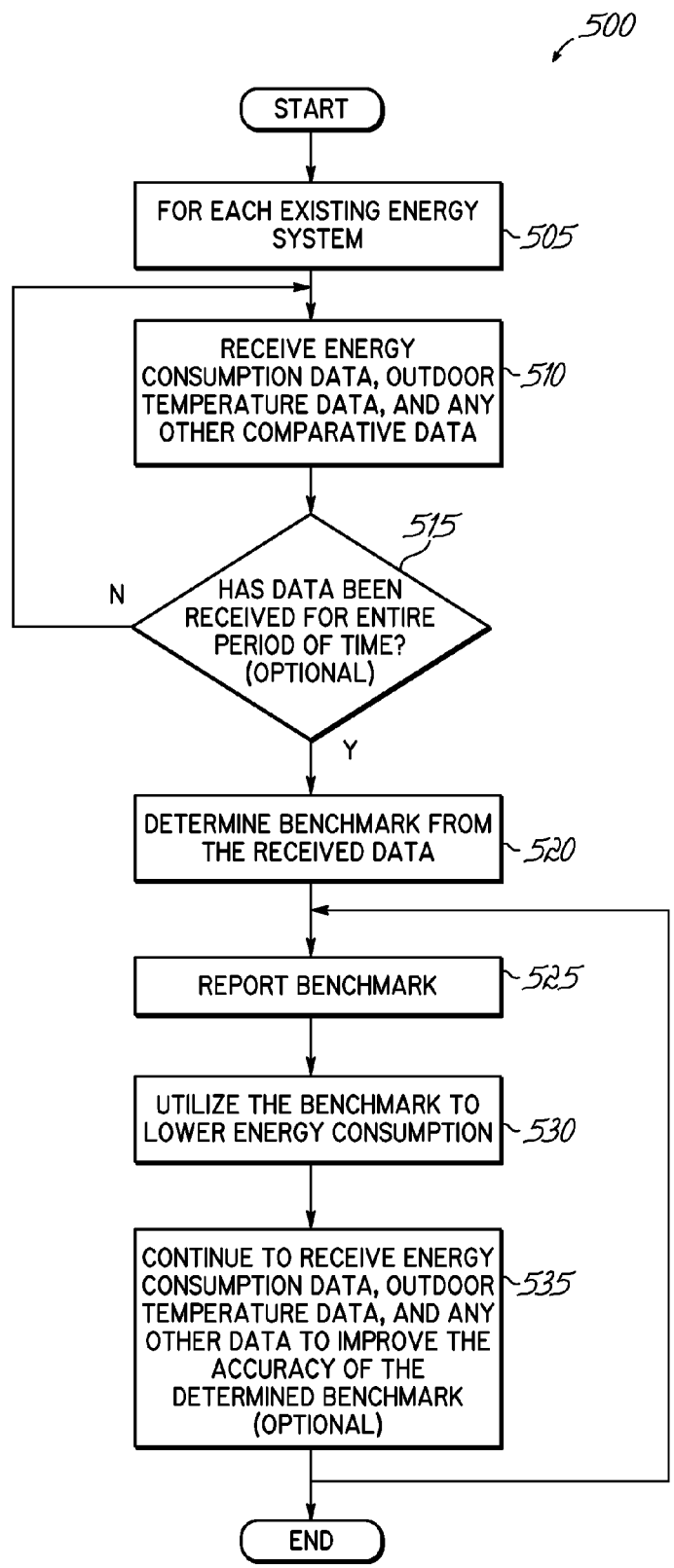
FIG. 5 illustrates an exemplary benchmark determination routine to be executed by the system of FIG. 1 or FIG. 2 consistent with the principles of the present invention.

Turning to FIG. 4, this figure illustrates a graphical representation of the benchmark for natural gas that may be determined and utilized consistent with the principles of the present invention. Specifically, graphical representation 450 illustrates some of the comparative data utilized to determine the benchmark, including energy consumption 455 in Mcf from 0 to 40 on the left of the graph over outdoor temperature 460 from zero to 125 degrees Fahrenheit on the bottom. Line 465 is at 65 degrees Fahrenheit, which is typically the point where heating and cooling demands are low. Data points 470 illustrate a variety of data points that may be received for an energy system, where each data point may indicate the energy consumption by the values on the left and the corresponding outdoor temperature with the values on the bottom, forming a scatter pattern. As discussed in connection with FIG. 3B, an upper bound, average bound, and/or lower bound may similarly be illustrated and utilized. Turning next to FIG. 5, this figure illustrates an exemplary benchmark determination routine 500 consistent with the principles of the present invention. Specifically, for each existing energy system (block 505), the steps of routine 500 after block 505 may be performed. Indeed, as energy systems may be configured differently, with some being older than others, it may be beneficial to determine a benchmark for each energy system. If there are multiple buildings, for example, a customer has six buildings and each building has an independent energy system, then it may be beneficial to determine a benchmark for each of the six energy systems (i.e., determine six benchmarks). Further, if one of these energy systems is later replaced, the benchmark should be started again after the replacement. Next, control may pass to block 510 to receive energy consumption data, outdoor temperature data, and any other comparative data. For example, other comparative data may be those discussed hereinabove, and may includes data that may be utilized for time correlation such as the corresponding time and/or date for the energy consumption data and/or the corresponding time and/or date for the outdoor temperature data, at timestamp, just the year, etc. Other comparative data may also include luminosity data such as sunlight load data, for example, the length of time that the sun is out may also affect energy consumption. As such, a device that measures luminosity or outdoor light may be utilized, as well as any luminosity data that may be received.

Block 515 determines whether data has been received for the entire period of time to be benchmarked (e.g., all the seasons that the energy system encounters in a year). Of note, a different period may be utilized. For example, three years or two years or one year of data may be utilized to determine the benchmark. If not, control may pass to block 510 to continue to receive the data. Block 515 may be optional.

If data has been received for the entire period, control may pass to block 520 to determine a benchmark from the received data. Once the benchmark is determined, it may be indicative of energy consumption that is expected by the energy system at different outdoor temperatures. For example, if the determined benchmark includes data for an outdoor temperature of 89 degrees Fahrenheit, then when the outdoor temperature is again similar to 89 degrees Fahrenheit, such as 89 or 89.4 or 90 or 91 degrees Fahrenheit, the determined benchmark may indicate the energy consumption that is expected by the energy system and utilized to identify deviations from that expectation, for instance. In some embodiments, assuming 89 degrees Fahrenheit is not in the benchmark, the benchmark for 88 or 90 degrees Fahrenheit, for example, may be utilized to indicate the expected energy consumption at 89 degrees Fahrenheit or 89.4 degrees Fahrenheit. As discussed hereinabove, the benchmark may be determined using statistical analysis and may be graphically illustrated or presented as a value or values. As explained hereinabove, the benchmark may be determined by adding up the received energy consumption data per outdoor temperature during the period of time, averaging the sums per outdoor temperature during the period, and normalizing the averages, if necessary. The determined benchmark may be reported at block 525 and utilized in a variety of ways (as will be discussed further in connection with FIGS. 6-7B), such as to lower energy consumption (block 530). Block 535, which is optional, may continue to receive energy consumption data, outdoor temperature data, and any other comparative data to improve the accuracy of the determined benchmark. For example, the benchmark may be determined for the winter season, and reported, but block 535 may continue to collect data for the spring season to improve upon the determined benchmark via additional statistical analysis, as the more data, the more accurate the benchmark may be for the energy system. Next, control may pass to blocks 525, 530, and 535 as appropriate (e.g., ending when additional data would no longer be statistically significant).

Figure 6:
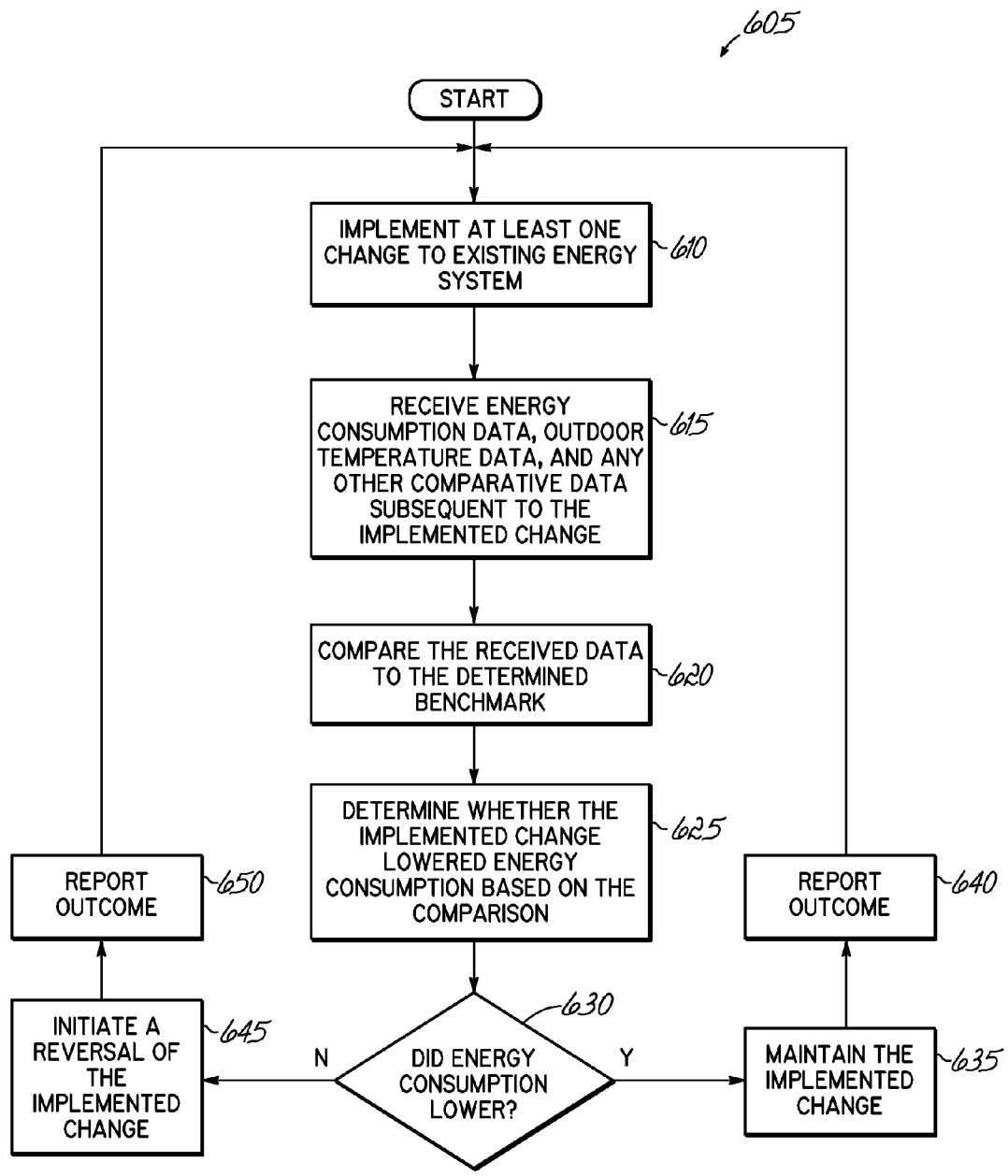
FIG. 6 illustrates an exemplary change impact routine to be executed by the system of FIG. 1 or FIG. 2 consistent with the principles of the present invention.

Turning to FIG. 6, this figure illustrates an exemplary change impact routine 605 consistent with the principles of the present invention. In particular, this routine illustrates how the determined benchmark may be utilized to determine the impact of an implemented change (e.g., intentional change) to verify if the implemented change was beneficial or detrimental. In particular, this routine may be utilized after the energy consumption by the energy system has been analyzed by an energy consultant (e.g., based on the determined benchmark), and as the energy consultant implements different changes (typically intentional changes) in order to try to lower energy consumption by the energy system. Block 610 implements at least one change to the existing energy system to lower energy consumption. For example, the change that is implemented may be associated with blower motor speeds, fan speeds, fan strategies, cycling times of an air conditioner (AC) and/or boiler, bringing the AC and/or boiler online or not during certain temperatures, filters, opening and/or closing of dampers and/or returns (e.g., automatically or manually), sun shade schedules, ceiling fans, attic fan, air pressure, peak strategies (e.g., shutting down the energy system an hour before and/or after peak), changes in use strategies (e.g., how lights are utilized, etc.), insulation, water temperature or hot water heaters, equipment (e.g., mechanical equipment), etc. Those of ordinary skill in the art will appreciate that other changes may also be implemented.

Of note, some changes are implemented manually, for example, by an energy consultant, while others may be implemented automatically. For changes that are implemented manually, block 610 may involve receiving an indication that a change has been manually implemented so as to be able to delineate comparative data prior to the implemented change from comparative data subsequent to the implemented change, and determine whether the implemented change truly lowered energy consumption. In some embodiments, block 610 may even be omitted when the change is implemented manually. Next, block 615 receives energy consumption data, outdoor temperature data, and any other comparative data subsequent to the implemented change, and block 620 compares the received data to the determined benchmark. How much comparative data should be received subsequent to an implemented change may depend upon what the data is showing. For example, a very small amount of data when compared to the determined benchmark may quickly indicate a detrimental change that increased energy consumption instead of lowering it. In some embodiments, one or more thresholds may be utilized such that when a threshold amount of comparative data is received subsequent to the change, the comparison of block 620 takes place, or the comparison may occur at a predetermined interval such as every seven days so as to quickly identify detrimental changes. The comparative data may be process in a manner similar to determining a benchmark. For example, if the determined benchmark is in the form of values based on energy consumption data per outdoor temperature (e.g., summing and averaging the energy consumption per outdoor temperature), then the same procedure may be performed on the subsequently received comparative data (i.e., summing and averaging the energy consumption per outdoor temperature), and once in the same form, the comparative data received subsequent to the benchmark may be compared to the determined benchmark. Similar, if the benchmark is in curve form or as a single value, the comparative data received subsequent to the benchmark mark may be processed in the same manner and compared. Indeed, the subsequently received comparative data may be averaged as in determining the benchmark, but need not be average. The exemplary report in Appendix G is illustrative.

Next, block 625 determines whether the implemented change lowered energy consumption based on the comparison. For example, did the data received subsequent to the implemented change create data points below the benchmark. Next, control may pass to block 630 to inquire if energy consumption lowered, if it did, the implemented change may be maintained at block 635 (e.g., an automatic reversal may be automatically cancelled based on the comparison), the outcome of the inquiry may be reported at block 640, and control may pass to block 610 to implement another change. If energy consumption did not lower, control may pass from block 630 to block 645 to initiate reversal of the implemented change (e.g., if the intentionally implemented change involved switching settings, initiating reversal of the implemented change may include automatic reversion to the settings that were in place before the switch, among others), the outcome of the inquiry may be reported at block 650 (e.g., by email), and control may pass to block 610 to implement another change. As such, the determined benchmark may be utilized to determine the impact of the implemented changes to the energy system. Alternatively, the outcomes in blocks 640 and 650 may be reported prior to blocks 635 and 645, respectively.

Those of ordinary skill in the art will appreciate that changes may be implemented one at a time or multiple changes may be implemented within a short timeframe. As such, routine 605 may be modified to accommodate both scenarios. For example, it may be more efficient to wait until all the changes are implemented to determine whether the implemented changes lowered energy consumption, but in the meanwhile, subsequent comparative data may be received as soon as each change is implemented.

Appendices B-C illustrate exemplary reports that may indicate that the implemented change(s) (not shown) lowered energy consumption. For example, information such as that contained in Appendix E may help identify which change or changes to implement. In this example, implementation of changes such as shutting down the energy system before and/or after peak time (i.e., peak time is approximately 11:00 AM-1:00 PM), instead of changes when the outdoor temperature is hotter as hotter temperatures often indicate higher energy usage, may be predicted to be more beneficial and were implemented. The last column of Appendix B, titled % of Change, indicates that changes were implemented, and these are reflected in the comparative data received subsequent to the implemented changes when compared to the determined benchmark for peak energy usage. Indeed, the report shows energy savings, for example, going from 2.65% in 2006 to 8.83% in 2007 and 17.01% in 2008. The last column of Appendix C, also titled % ofChange, indicates that changes were implemented, reflected in the comparative data received subsequent to the implemented changes when compared to the determined benchmark for off peak energy usage, and reported. This report shows energy savings as well, going from 2.83% in 2006 to 8.36% in 2007 and 17.17% in 2008. The second to last column, titled kWh Difference, and the KWh Energy Reduction For All Years** row, and the KWh Energy Reduction % For All Years row further report the lower energy consumption. Appendix A is also an exemplary report that illustrates lowered energy consumption, both in value form and in curve form.

The determined benchmark may also be utilized to identify at about when a change or changes should be implemented, in some embodiments. For example, the negative values in the last column of Appendix G, titled % of Change, correspond to outdoor temperatures (OSA temp column) that increase energy consumption when compared to the benchmark in the kWh Benchmark column. At 6 degrees Fahrenheit in 2004, for instance, energy consumption increased by 11.17% (i.e., −11.17%) when compared to the determined benchmark and this very negative number may indicate that a change should be implemented when the outdoor temperature will be similar to 6 degrees Fahrenheit to reduce energy consumption (e.g., from weather forecast data that may be received and processed by the system of FIG. 1 or 2 such as the server computer 214, under control of the CPU 226). Thus, the determined benchmark may be utilized to identify at about when a change should be implemented to the energy system.

Moreover, the change to be implemented may simply be to increase the heat in the facility (or prevent settings that would lower or shut down the heat) to compensate for the 6 degrees Fahrenheit, as the last column of Appendix G illustrates that although energy consumption was higher than the benchmark when the outdoor temperatures were 7-10 degrees Fahrenheit, none of % of Change for 7-10 degrees Fahrenheit was as dramatic as that at 6 degrees Fahrenheit (i.e., the energy consumption at 7-10 degrees was not as high as the energy consumption at 6 degrees Fahrenheit). Other changes such as this may be consistently implemented using a list of triggers (e.g., in a database such as the database 231) so that an encountered triggering event identifies which change from among a plurality of changes should be implemented automatically or manually (e.g., by automatically notifying designated personnel to manually implement the identified change). Thus, the determined benchmark may also be utilized to identify which change should be implemented to the energy system.

Figure 7A:
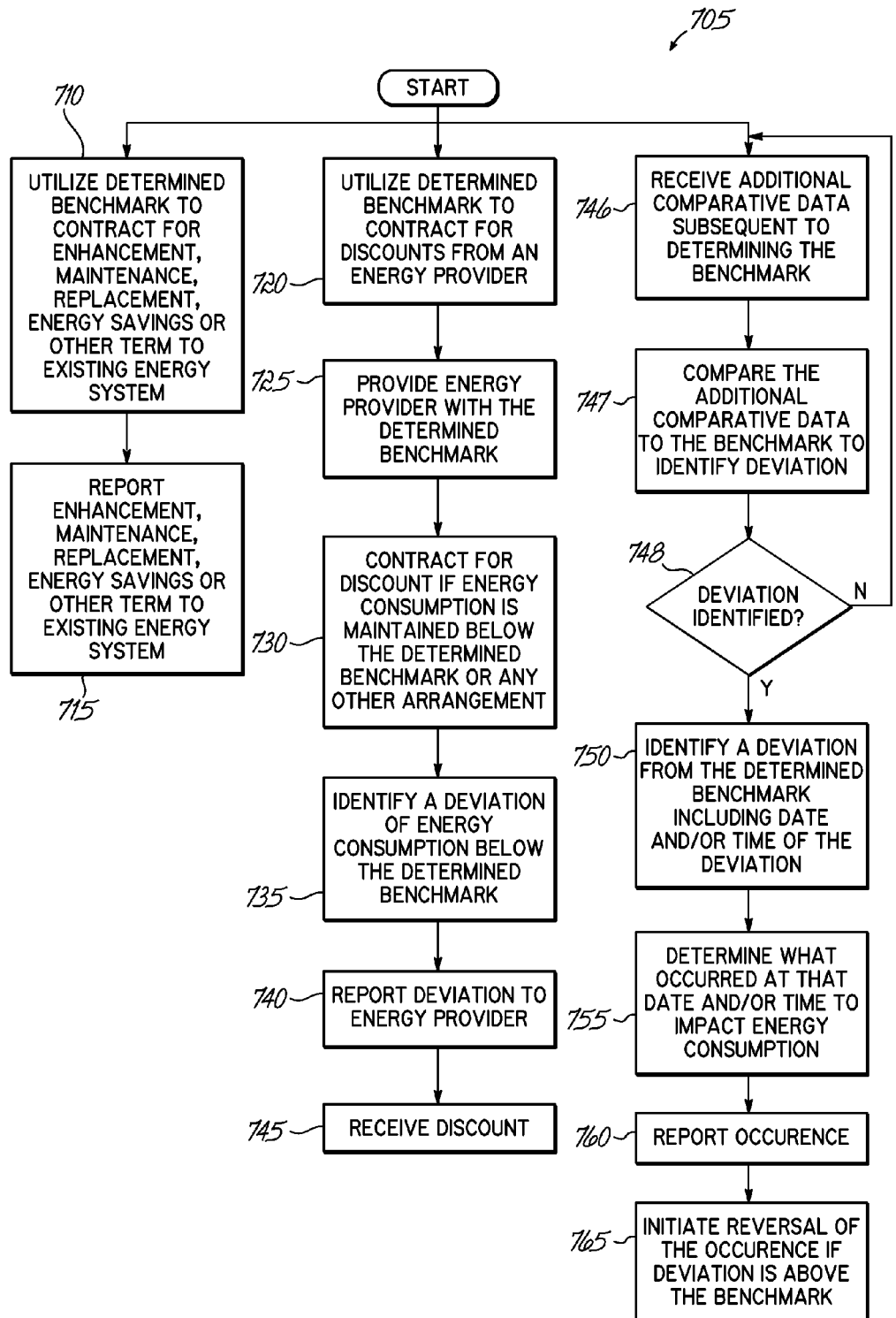
FIGS. 7A-7B illustrates exemplary benchmark utilization routines to be executed by the system of FIG. 1 or FIG. 2 consistent with the principles of the present invention.

These utilizations of the determined benchmark may be part of block 610 of routine 605, which may be executed by the system of FIG. 1 or 2 such as by the server computer 214, under control of the CPU 226, and may include automatic determination of what change should be implemented and/or automatic determination of about when to implement a change. Although identification of when a change should be implemented and/or which change should be implemented may work in conjunction with determining the impact of the implemented change, in some embodiments, these may be three separate uses of the benchmark. Turning to FIG. 7A, this figure illustrates an exemplary benchmark utilization routine 705 consistent with the principles of the present invention. In particular, this routine illustrates other uses for the determined benchmark, and may be separated into three exemplary independent routines in some embodiments. Specifically, block 710 utilizes the determined benchmark to contract for an enhancement (e.g., enhancement of the whole energy system or a portion of the energy system), maintenance (e.g., maintenance of the whole energy system or a portion of the energy system), replacement (e.g., replacement of the whole energy system or a portion of the energy system), energy savings, and/or other term to the existing energy system, as well as setting the term in the agreement.

For example, in the context of utilizing the determined benchmark, the benchmark may provide requirements such as minimum energy savings that must be met by any enhancement or any replacement to the energy system. As another example, the benchmark may indicate the type of efficiency required to warrant replacement or enhancement to the energy system. The determined benchmark may also set the minimum energy savings expected to be accomplished (e.g., by an energy consultant) based on how the energy system has historically performed per the benchmark, or may set the minimum efficiency expected after maintenance to ensure that the maintenance did not negatively impact the energy system. In particular, these terms may be considered implemented changes once they are implemented and routine 605 in FIG. 6 may be utilized, but need not be, to determine their impact on the energy system.

Block 710 may determine, for example, numeric terms to an agreement, including an exact term or a range of terms (e.g., range of percentages) consistent with the determined benchmark (and other historical data such as historical energy savings based on the determined benchmark) to contract for in the agreement. The chosen term, for example, may be automatically placed into the agreement.

Next, block 715 may report an enhancement, maintenance, replacement, energy savings, and/or other term to the existing energy system (e.g., via email to the appropriate personnel). A check that the contracted for term of the agreement has been satisfied may be performed (e.g., enhancement and/or replacement meets the requirements prescribed by the determined benchmark as set out in the agreement) (discussed further in connection with FIG. 7B). Nonetheless, the contracting for terms may be based upon benchmark-verified performance of the energy system.

Appendices B-C include exemplary reports that may illustrate how the determined benchmark may be utilized to contract for at least one term in an agreement. The last column of Appendix B, titled % of Change, indicates that efficiency had improved by about 2% in each of 2004, 2005, and 2006 based upon the information in the corresponding rows, with the 2% figure determined by comparing comparative data subsequent to the determined benchmark to the determined benchmark (as described hereinabove in connection with FIG. 6). Thus, the determined benchmark may be utilized to contract for an energy savings term of at least 2% in an agreement, instead of, for example, 30%, as use of the benchmark indicates that 2% is more realistic with this energy system. And, to warrant replacement and/or enhancement, the determined benchmark may be utilized to contract for at least a 5% energy savings term to justify the expense. Similarly, when it comes to maintenance, the determined benchmark may be utilized to contract for maintenance that will not ruin the energy savings achieved thus far, for example. Those of ordinary skill in the art will appreciate that more realistic terms may be contracted for in agreements, which may benefit the customer and/or the energy consultant, and may help these entity set measurable standards. The last column of Appendix C, also titled % of Change, may similarly illustrate utilization of the determined benchmark to contract for at least one term in an agreement.

Turning to block 720, block 720 may utilize the determined benchmark to contract for discounts from an energy provider such as the utility companies 25 (FIG. 1). For example, block 725 may provide energy provider with the determined benchmark so that the energy provider will be able to gage the typical energy consumption by the energy system. Next, block 730 contracts for a discount if energy consumption is maintained below the determined benchmark or any other arrangement that the energy provider wants to enter into with the customer running the energy system. Of note, in some situations contracting for a discount from the energy provider may not be possible. For example, some energy providers have a regulated price structure, for example, based on charging for peak load, and as a result, may not be able to contract for discounts.

At block 735, subsequent to the effective date of the agreement, a deviation of energy consumption below the determined benchmark may be identified (discussed further in connection with blocks 746-765 hereinbelow). In particular, the deviation may be set as part of the agreement between the parties. It may be a specific number or percentage deviation. The deviation may be reported to the energy provider, for example, electronically, and may include any confirmation required by the energy provider under the contract terms. The discount may be received at block 745, and may include confirmation of the discount on the next bill from the energy provider. As an alternative to a discount, the customer running the energy system and the energy provider may contract for other rewards or terms, also computed using deviation from the benchmark, or may alter the pricing model. Indeed, the energy provider may reward the customer if peak energy consumption is below where it typically should be according to the determined benchmark. Nonetheless, the energy provider and the customer may benefit from curtailment of energy consumption.

Turning to block 746, block 746 may utilize the determined benchmark to identify deviations from the determined benchmark. The deviations in energy consumption may be below or above the determined benchmark at a temperature that correlates to a similar outdoor temperature (e.g., a current outdoor temperature subsequent to the determined benchmark). Similar outdoor temperature refers to an outdoor temperature subsequent to the determined benchmark, and it may be a subsequently similar outdoor temperature that is encountered in real-time or it may be a delayed subsequently similar outdoor temperature that was encountered. For example, if the determined benchmark includes data for an outdoor temperature of 89 degrees Fahrenheit, then when the outdoor temperature is subsequently similar to 89 degrees Fahrenheit, such as 89 or 89.4 or 90 or 91 degrees Fahrenheit, the determined benchmark may indicate the energy consumption that is expected by the energy system. In some embodiments, assuming 89 degrees Fahrenheit is not in the benchmark, the benchmark for 88 or 90 degrees Fahrenheit, for example, may be utilized to indicate the expected energy consumption at 89 or 89.4 or 90 or 91 degrees Fahrenheit. And deviations may be identified based on the benchmark when the temperature was first encountered and when a subsequently similar outdoor temperature is encountered.

Block 746 receives additional comparative data subsequent to determining the benchmark (e.g., the quantity of data may depend upon thresholds, etc.), and the block 747 compares the additional comparative data to the benchmark to identify any deviations as described in connection with FIG. 6. Indeed, Block 748 determines whether any deviations have been identified, if so, block 750 identifies the deviation from the determined benchmark, which may include the date and/or time of the deviation, by comparing the energy usage expected from the benchmark for the outdoor temperatures to the energy consumption that was recently observed for the similar outdoor temperatures to identify the deviation. For example, an unplanned, unintentional, or unexpected change may occur to the energy system, such as a painter or repairman closing or blocking vents, which may increase energy consumption above typical usage for an outdoor temperature based upon the determined benchmark. And as the change is unplanned or unexpected it may be difficult to determine what occurred to cause the deviation. However, block 750 identifies the deviation, and block 755 may determine what occurrence at that date and/or time likely caused the deviation. For example, computer records of the painters and repairmen that were on site at approximately that date and/or time may be retrieved and analyzed, and ultimately, the likely cause of the deviation may be identified. Block 760 reports the occurrence, or multiple occurrences if such is determined, and block 765 may initiate reversal of the occurrence if the deviation is above the benchmark, as a deviation below the benchmark like provides energy savings and should be maintained (see FIG. 6). Initiating reversal of the occurrence may include automatically identifying equipment that was on before the deviation but that was off after the deviation, determining whether that equipment was scheduled to be turned off, and if not scheduled to be turned off, turning that equipment back on, or automatically identifying maintenance in the building at about the time of the occurrence and automatic notification to the designated personnel of the same to inspect the maintenance area and manually perform the reversal (e.g., unblock the blocked vents). Nonetheless, a change of energy use relative to the benchmark prediction or expectation may be identified, and the date and/or time may be utilized to find the cause of the change. Returning to block 748, if no deviation is identified, control may pass to block to 746 to continue to receive additional comparative data subsequent to determining the benchmark.

Figure 7B:
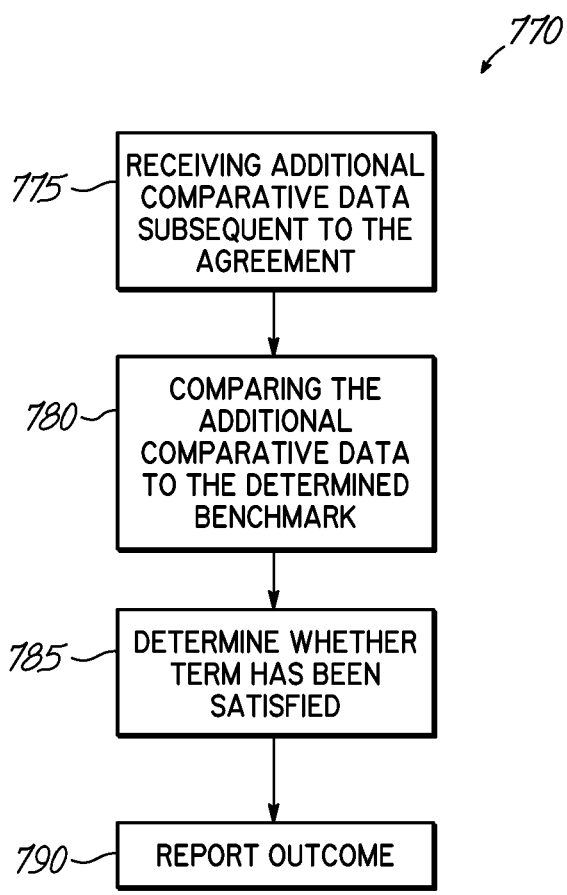

Turning to FIG. 7B, this figure illustrates another exemplary benchmark utilization routine 770 to verify satisfaction of a term in an agreement. Specifically, block 775 receives additional comparative data subsequent to the agreement (e.g., effective date of the agreement), and the block 747 compares the additional comparative data to the benchmark (as in FIG. 6). Next, block 785 determines whether the term has been satisfied, and the outcome is reported (block 790). For example, if the term in the agreement requires energy savings of 7%, then block 785 may determine if the energy savings were at least 7% based on a comparison of the additional comparative data after the agreement and the determined benchmark.

This routine may be executed, but need not be, in conjunction with blocks 710 and 715 in FIG. 7A where the term is set, for example, as a percentage of energy savings by the energy system. To continue the examples in connection with blocks 710 and 715, block 785 may determine whether an energy savings term of at least 2% in an agreement has been satisfied, as well as whether a term of at least 5% in energy savings was met to warrant replacement and/or enhancement. The term may be practically any term that the determined benchmark may be utilized to verify, at least partially verify, and may be associated with a discount from any energy provider, an energy savings (e.g., requirement to be satisfied by an energy consultant or must be satisfied to avoid a penalty), etc. Those of ordinary skill in the art will appreciate that by verifying satisfaction of term or terms in an agreement, energy consultants may be better able to explain that the energy savings of their services exceed the costs of their services and also be able to measure their accomplishments. Customers may also benefit by the verifiable and measurable results. While embodiments of the present invention have been illustrated by a description of the various embodiments and the examples, and while these embodiments have been described in considerable detail, it is not the intention of the applicant to restrict or in any way limit the scope of the appended claims to such detail. Additional advantages and modifications will readily appear to those skilled in the art. For example, another advantage may be that the state 1 of block 825 may be better able to determine the energy efficiencies of its schools, including which schools in the school districts and/or which school districts are the most energy efficient, identify the changes implemented in those schools or deviations that lowered energy consumption (see FIGS. 6-7A), implement them in less efficient schools, and learn the impact of those changes in the less efficient schools, among others. Indeed, a competition may be initiated among entities to identify the entity with the highest energy efficiency, and a prize(s) may be awarded to the winner. Thus, the invention in its broader aspects is therefore not limited to the specific details, representative apparatus and method, and illustrative example shown and described. In particular, any of the blocks of the above flowcharts may be deleted (e.g., those listed as optional in FIG. 5), augmented, made to be simultaneous with another, combined, or be otherwise altered in accordance with the principles of the present invention. Similarly, the routines in the flowcharts may be utilized in conjunction with other routines or separately. Further, each of the routines, or embodiments thereof, may be distributed in one or more program products. Accordingly, departures may be made from such details without departing from the spirit or scope of applicants' general inventive concept. Other modifications will be apparent to one of ordinary skill in the art. Therefore, the invention lies in the claims hereinafter appended.

What is claimed is:

1. A computer implemented method of using a benchmark of energy consumption for an energy system, the method comprising:

collecting comparative data for the energy system, wherein the collected comparative data includes outdoor air heating/cooling load data for a plurality of intervals of no more than an hour, and wherein the received comparative data for an interval includes energy consumption data for the energy system during the interval and the corresponding outdoor air heating/cooling load data for the interval;

determining, by a processor, the benchmark based upon comparative data collected in the collecting step, wherein the determined benchmark at a specific outdoor air heating/cooling load is an average derived only from energy consumption data for intervals with the specific outdoor air heating/cooling load; and determining, by a processor, impact of implementation of at least one change in the operation of the energy system, by comparing the energy use a particular outdoor air heating/cooling load to the energy use expected for the particular outdoor air heating/cooling load indicated by the benchmark.

2. The method of claim 1, wherein determining impact of implementation of at least one change in the operation of the energy system utilizing the determined benchmark includes receiving additional comparative data subsequent to implementation of the at least one change to the energy system, wherein the received additional comparative data includes outdoor temperature data for a plurality of outdoor temperatures over a period of time that the energy system is activated, and wherein the received comparative data includes energy consumption data for the energy system corresponding to the received outdoor temperature data.

3. The method of claim 2, wherein determining impact of implementation of at least one change in the operation of the energy system utilizing the determined benchmark includes comparing the additional comparative data received subsequent to the implemented change to the determined benchmark.

4. The method of claim 3, wherein determining impact of implementation of at least one change in the operation of the energy system utilizing the determined benchmark includes determining whether the implemented change lowered energy consumption by the system based on the comparison.

5. The method of claim 4, wherein determining that the implemented change did not lower energy consumption by the energy system, further comprising initiating reversal of the implemented change.

6. The method of claim 4, wherein determining that the implemented change lowered energy consumption by the energy system, further comprising maintaining the implemented change.

7. The method of claim 1, wherein determining impact of implementation of at least one change in the operation of the energy system utilizing the determined benchmark includes identifying which change should be implemented to the energy system based upon the determined benchmark, and wherein the identified change is the change of claim 1.

8. The method of claim 1, wherein determining impact of implementation of at least one change in the operation of the energy system utilizing the determined benchmark includes identifying at about when the change should be implemented to the energy system based upon the determined benchmark.

9. A computer implemented method of using a benchmark of energy consumption for an energy system, the method comprising:

collecting comparative data for the energy system, wherein the collected comparative data includes outdoor air heating/cooling load data for a plurality of intervals of no more than an hour, and wherein the received comparative data for an interval includes energy consumption data for the energy system during the interval and the corresponding outdoor air heating/cooling load data for the interval;

determining, by a processor, the benchmark based upon comparative data collected in the collecting step, wherein the determined benchmark at a specific outdoor air heating/cooling load is an average derived only from energy consumption data for intervals with the specific outdoor air heating/cooling load;

collecting additional comparative data subsequent to determining the benchmark; and comparing the additional comparative data to the determined benchmark to identify at least one deviation in energy consumption.

10. The method of claim 9, further comprising identifying at least one deviation in energy consumption by the energy system based on the comparison.

11. The method of claim 10, wherein identifying at least one deviation in energy consumption by the energy system based on the comparison includes identifying a deviation of energy consumption by the energy system that is below the determined benchmark at an outdoor temperature that correlates to a similar outdoor temperature, wherein the similar outdoor temperature is subsequent to the determined benchmark.

12. The method of claim 10, wherein identifying at least one deviation in energy consumption by the energy system based on the comparison includes identifying a deviation of energy consumption by the energy system that is above the determined benchmark at an outdoor temperature that correlates to a similar outdoor temperature, wherein the similar outdoor temperature is subsequent to the determined benchmark.

13. The method of claim 12, wherein the deviation in energy consumption by the energy system is above the determined benchmark at an outdoor temperature that correlates to a similar outdoor temperature, further comprising initiating reversal of the determined occurrence.

14. The method of claim 10, further comprising determining what occurrence caused the identified deviation in energy consumption by the energy system.

15. The method of claim 14, wherein determining what occurrence caused the identified deviation in energy consumption by the energy system includes analyzing time correlation data associated with the identified deviation.

16. An apparatus, comprising:
at least one processor; and
a memory including program code, the program code configured to be executed by the at least one processor to use a benchmark of energy consumption for an energy system by collecting comparative data for the energy system, wherein the collected comparative data includes outdoor air heating/cooling load data for a plurality of intervals of no more than an hour, and wherein the received comparative data for an interval includes energy consumption data for the energy system during the interval and the corresponding outdoor air heating/cooling load data for the interval;

determining the benchmark based upon comparative data collected in the collecting step, wherein the determined benchmark at a specific outdoor air heating/cooling load is an average derived only from energy consumption data for intervals with the specific outdoor air heating/cooling load; and determining impact of implementation of at least one change in the operation of the energy system utilizing the determined benchmark.

17. The apparatus of claim 16, wherein the program code is further configured to determine impact of implementation of at least one change in the operation of the energy system utilizing the determined benchmark by receiving additional comparative data subsequent to implementation of the at least one change to the energy system, wherein the received additional comparative data includes outdoor temperature data for a plurality of outdoor temperatures over a period of time that the energy system is activated, and wherein the received comparative data includes energy consumption data for the energy system corresponding to the received outdoor temperature data.

18. The apparatus of claim 17, wherein the program code is further configured to determine impact of implementation of at least one change in the operation of the energy system utilizing the determined benchmark by comparing the additional comparative data received subsequent to the implemented change to the determined benchmark.

19. The apparatus of claim 18, wherein the program code is further configured to determine impact of implementation of at least one change in the operation of the energy system utilizing the determined benchmark by determining whether the implemented change lowered energy consumption by the energy system based on the comparison.

20. The apparatus of claim 19, wherein the program code determines that the implemented change did not lower energy consumption by the energy system, and wherein the program code is further configured to initiate reversal of the implemented change.

21. The apparatus of claim 19, wherein the program code determines that the implemented change lowered energy consumption by the energy system, and wherein the program code is further configured to maintain the implemented change.

22. The apparatus of claim 16, wherein the program code is further configured to determine impact of implementation of at least one change in the operation of the energy system utilizing the determined benchmark by identifying which change should be implemented to the energy system based upon the determined benchmark, and wherein the identified change is the change of claim 16.

23. The apparatus of claim 16, wherein the program code is further configured to determine impact of implementation of at least one change in the operation of the energy system utilizing the determined benchmark by identifying at about when the change should be implemented to the energy system based upon the determined benchmark.

24. An apparatus, comprising:
at least one processor; and
a memory including program code, the program code configured to be executed by the at least one processor to use a benchmark of energy consumption for an energy system by
collecting comparative data for the energy system, wherein the collected comparative data includes outdoor air heating/cooling load data for a plurality of intervals of no more than an hour, and wherein the received comparative data for an interval includes energy consumption data for the energy system during the interval and the corresponding outdoor air heating/cooling load data for the interval;
determining the benchmark based upon comparative data collected in the collecting step, wherein the determined benchmark at a specific outdoor air heating/cooling load is an average derived only from energy consumption data for intervals with the specific outdoor air heating/cooling load;

receiving additional comparative data subsequent to determining the benchmark; and comparing the additional comparative data to the determined benchmark to identify at least one deviation in energy consumption.

25. The apparatus of claim 24, wherein the program code is further configured to identify at least one deviation in energy consumption by the system based on the comparison.

26. The apparatus of claim 25, wherein the program code is further configured to identify at least one deviation in energy consumption by the energy system based on the comparison by identifying a deviation of energy consumption by the energy system that is below the determined benchmark at an outdoor temperature that correlates to a similar outdoor temperature, wherein the similar outdoor temperature is subsequent to the determined benchmark.

27. The apparatus of claim 25, wherein the program code is further configured to identify at least one deviation in energy consumption by the energy system based on the comparison by identifying a deviation of energy consumption by the energy system that is above the determined benchmark at an outdoor temperature that correlates to a similar outdoor temperature, wherein the similar outdoor temperature is subsequent to the determined benchmark.

28. The apparatus of claim 27, wherein the deviation in energy consumption by the energy system is above the determined benchmark at an outdoor temperature that correlates to a similar outdoor temperature, and wherein the program code is further configured to initiate reversal of the determined occurrence.

29. The apparatus of claim 25, wherein the program code is further configured to determine what occurrence caused the identified deviation in energy consumption by the energy system.

30. The apparatus of claim 29, wherein the program code is further configured to determine what occurrence caused the identified deviation in energy consumption by the energy system by analyzing time correlation data associated with the identified deviation.

* * * * *